(12) United States Patent
Provost et al.

(10) Patent No.: US 6,801,781 B1
(45) Date of Patent: Oct. 5, 2004

(54) PROVIDING A SUPPLEMENTARY SERVICE IN A MOBILE COMMUNICATIONS SYSTEM

(75) Inventors: Curtis M. Provost, Parker, TX (US); Jerry L. Mizell, Plano, TX (US); Donald B. Keeler, McKinney, TX (US)

(73) Assignee: Nortel Networks Limited, St. Laurent (CA)

( * ) Notice: Subject to any disclaimer, the term of this patent is extended or adjusted under 35 U.S.C. 154(b) by 529 days.

(21) Appl. No.: 09/703,182

(22) Filed: Oct. 31, 2000

(51) Int. Cl.$^7$ ................................................ H04Q 7/20
(52) U.S. Cl. .................... 455/466; 455/406; 370/328
(58) Field of Search ............................... 455/466, 405, 455/406, 408, 418, 419, 433, 414, 456; 370/328, 338

(56) References Cited

U.S. PATENT DOCUMENTS 6,496,690 B1 * 12/2002 Cobo et al. ................. 455/408
2002/0006780 A1 * 1/2002 Bjelland et al. ............. 455/406
2002/0029189 A1 * 3/2002 Titus et al. .................... 705/39

FOREIGN PATENT DOCUMENTS

WO    WO 01/22761    * 3/2001    ............ H04Q/7/38

* cited by examiner

Primary Examiner—Erika Gary
(74) Attorney, Agent, or Firm—Trop, Pruner & Hu, P.C.

(57) ABSTRACT

A mobile communications system includes a system controller that provides access control for mobile stations within the network controlled, by the system controller. In one example, the mobile communications network is a General Packet Radio Service (GPRS) network. The system controller provides access to a packet-based data network. In addition, the system controller enables prepaid short message service (SMS), in which mobile stations can originate or receive short messages according to the prepaid SMS. A flag kept in a home location register (HLR) stores a field to indicate if the user has subscribed to prepaid SMS. In one embodiment, the field is an access point name (APN) field according to the General Packet Radio Service (GPRS) protocol.

29 Claims, 6 Drawing Sheets

PROVIDING A SUPPLEMENTARY SERVICE IN A MOBILE COMMUNICATIONS SYSTEM

TECHNICAL FIELD

The invention relates generally to providing a supplementary service, such as a short message service, in a mobile communications system.

BACKGROUND

Mobile communications systems, such as cellular or personal communications services (PCS) systems, are made up of a plurality of cells. Each cell provides a radio communications center in which a mobile unit establishes a call with another mobile unit or a wireline unit connected to a public switched telephone network (PSTN). Each cell includes a radio base station, with each base station connected to a mobile switching center that controls processing of calls between or among mobile units or mobile units and PSTN units.

Several protocols exist for circuit-switched wireless communications, including the advanced mobile phone system (AMPS) standard, the TIA/EIA-136 time-division multiple access (TDMA) protocol from the Telecommunications Industry Association (TIA), the Global System for Mobile (GSM) TDMA protocol from the European Telecommunications Standards Institute (ETSI), and the IS-95, IS-95A, and IS-95B code-division multiple access (CDMA) standards from the TIA.

Traditional speech-oriented wireless systems utilize circuit-switched connection paths in which a channel (or a portion of channel such as a time slot) is occupied for the duration of the connection between a mobile unit and the mobile switching center. Such a connection is optimum for communications that are relatively continuous, such as speech. However, data networks such as local area networks (LANs), wide area networks (WANs), and the Internet use packet-based connections, in which communication between nodes on a communications link is performed with data packets. Each node occupies the communications link only for as long as the node needs to send or receive data packets. Such communications are bursty in nature, with packets sent in bursts followed by periods of inactivity.

One wireless communications protocol for providing more efficient connections between a mobile unit and a packet-based data network such as an Internet Protocol (IP) network includes the General Packet Radio Service (GPRS) protocol from ETSI, with versions complementing existing GSM systems and TIA/EIA-136 systems. In a GPRS communications system, various entities are present. A serving GPRS support node (SGSN) controls communications between mobile units and a packet-based data network. The SGSN is typically connected to a gateway GPRS support node (GGSN), which provides the interface to the packet-switched data network. The SGSN is connected to base station systems (BSS) over respective Gb interfaces, which provide for the exchange of control signaling and user data. Versions of GPRS also include Enhanced GPRS (EGPRS) and EGPRS COMPACT. Another wireless communications protocol, used for CDMA systems and that provides efficient packet-based communications, is the IS-2000 standard established by the TIA.

In addition to basic voice call services, mobile communication systems also provide various supplementary services to users. Depending on the service provider, service fees may be charged for services that users subscribe to. Thus, while users have the flexibility in selecting services that they desire, service providers are able to extract revenue from supplementary services. One type of supplementary service is a short message service (SMS). SMS can be used to carry paging data to enable a caller to page a mobile telephone (similar to sending pages to pagers). Short message service is also used to deliver voice mail waiting indicators as well as to deliver data such as sports scores, stock tickers, and other short messages.

Although SMS enables convenient communication with remote users, some mobile communications systems have not defined a mechanism to support some forms of short message services (e.g., prepaid short message services). A prepaid short message service is a service that a user has prepaid and that can be used as long as the associated prepaid account has a sufficient balance. Other types of prepaid supplementary services also exist.

A need thus continues to exist for mechanisms to enable some forms of supplementary services, such as prepaid short message services.

SUMMARY

In general, according to one embodiment, a system for use in a mobile communications system comprises an interface to receive a predetermined field from a home location register to indicate whether a user has subscribed to a prepaid supplementary service. A controller is adapted to provide access to packet-based network and to enable the prepaid supplementary service if the predetermined field has a first state.

Some embodiments of the invention may have one or more of the following advantages. More services can be provided to users in some mobile communications systems. With a greater variety of services available to users, user convenience is enhanced. Also, service providers benefit by being able to collect revenue based on usage of such supplementary services.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
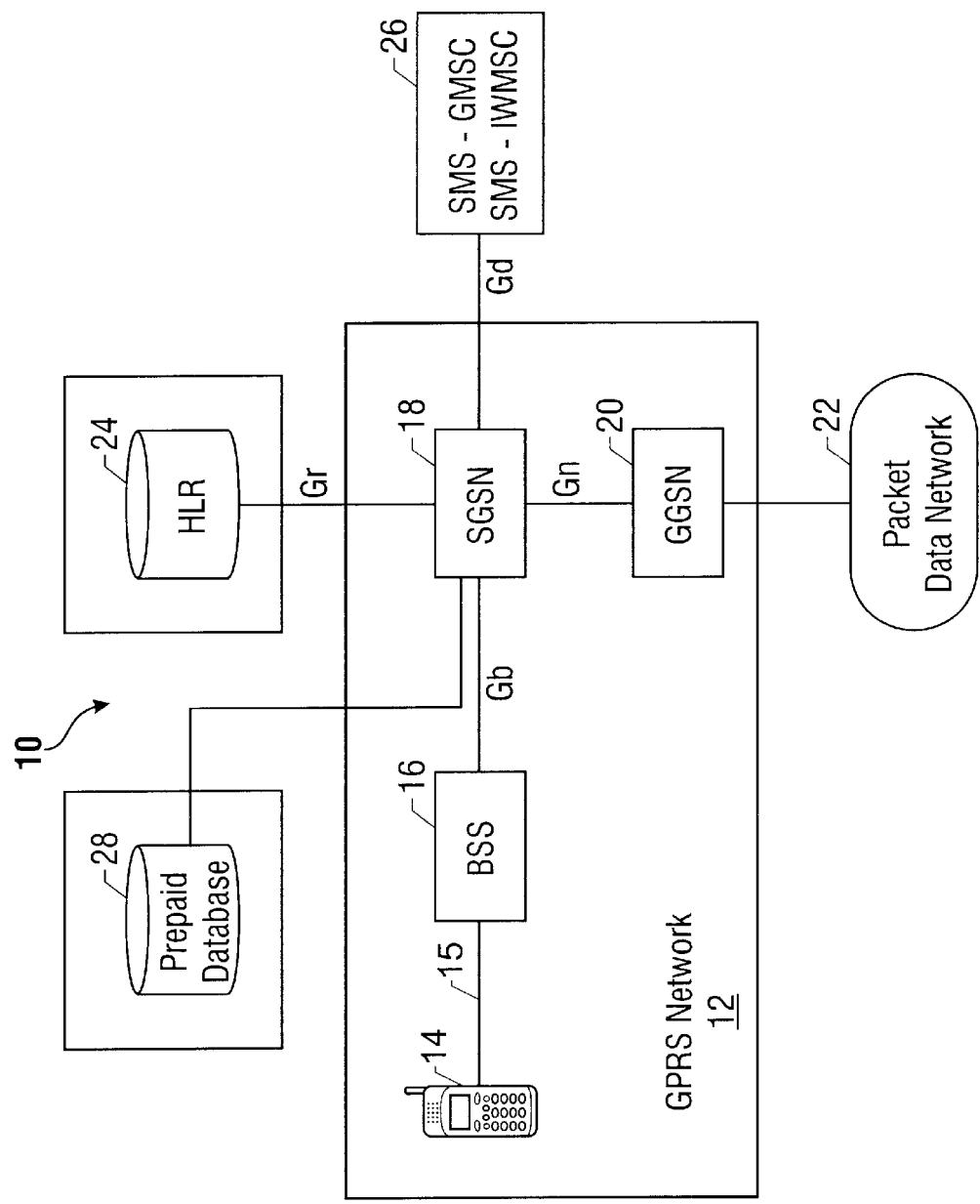
FIG. 1 is a block diagram of an embodiment of a mobile communications system.

Referring to FIG. 1, a mobile communications system 10 according to one embodiment includes a General Packet Radio Service (GPRS) network 12 that includes a serving GPRS support node (SGSN) 18, a plurality of base stations systems (BSS) 16 coupled to the SGSN over the Gb interface, and mobile stations 14 coupled over wireless links 15 to the BSS 16. The GPRS network 12 also includes a gateway GPRS support node (GGSN) 20 coupled to the SGSN 18 over a Gn interface. The GGSN 20 is coupled to a packet-based data network 22. Although shown as two separate components, the SGSN 18 and GGSN 20 may be part of the same platform. The GPRS standard is defined by the European Telecommunications Standards Institute (ETSI). In further embodiments, the GPRS network 12 can alternatively be an Enhanced GPRS (EGPRS) network or an EGPRS COMPACT network. In yet other embodiments, other types of mobile communications networks can be employed.

The SGSN 18 is basically the system controller to provide access control for mobile stations 14 and to track locations of the mobile stations. GGSN 20 provides interworking with the packet-based data network 22. Although one data network 22 is shown in FIG. 1, other embodiments may have plural data networks that are accessible by the GGSN 20. In one embodiment, the packet-based data network 22 is an Internet Protocol (IP) network. One version of IP is described in Request for Comments (RFC) 791, entitled "Internet Protocol," dated September 1981; and another version of IP is described in RFC 2460, entitled "Internet Protocol, Version 6 (IPv6) Specification," dated December 1998. Examples of the data network 22 include local area networks (LANs), wide area networks (WANs), and public networks such as the Internet.

The SGSN 18 provides access to the packet-based network 22 through the GGSN 20 so that mobile stations 14 can perform packet-based communications with another node coupled to the packet-based data network 22. Such communications include electronic mail, web browsing, text chat, and so forth. Also, packet-based voice communications are also possible between the mobile station 14 and another node coupled to the packet-based data network 22. For example, voice communications over an IP network is referred to as voice-over-IP. Other real-time, interactive communications between the mobile station 14 and a node coupled to the packet-based data network 22 are also possible, such as video conferencing, multimedia communications, and so forth.

In addition to the primary services discussed above, the SGSN 18 is also able to offer supplementary services in accordance with some embodiments. One example supplementary service is prepaid short message service (SMS). Prepaid SMS refers to SMS that has been prepaid by a user. The prepaid amount is kept in a prepaid database 28, which tracks account balances for each subscriber. The prepaid account balance is decremented with each use of SMS by the user. SMS provides the ability to send various types of short messages to users. For example, short messages may be used to carry paging data to enable a caller to send a page (carrying the caller's telephone number or a short text message) to another mobile station. Short messages can also be used to deliver voice mail waiting indicators, sports tickers, stock tickers, and other information.

In other embodiments, a user may subscribe to other types of prepaid supplementary services. Whether a service, such as prepaid SMS, is enabled or not depends on subscription information stored in a home location register (HLR) 24 for each user that is accessible by the SGSN 18 over a Gr interface. The HLR GPRS subscription data stored in the HLR 24 contains various information for each subscriber. Example types of information include an SGSN number, which is the Signaling System No. 7 (SS7) number of the SGSN currently serving the mobile station, the SGSN address, which is the IP address of the SGSN currently serving the mobile station, SMS parameters, the packet data protocol (PDP) type (e.g., IP or X.25), the quality of service (QoS) profile that is subscribed to, and other information. Another parameter that is stored in the HLR 24 includes one or more access point name (APN) fields. Typically, an APN field is a label in accordance with domain name system (DNS) naming conventions that describes or indicates the access point to an external packet data network, such as data network 22. For example, one APN may indicate connectivity to the Internet, while another APN may indicate connectivity to a corporate intranet (LAN or WAN). In accordance with some embodiments, another APN field in the HLR 24 is used as a flag to inform the SGSN 18 that the mobile station 14 is subscribed to prepaid SMS or other supplementary services (referred to as "SMS APN").

Once the SGSN 18 determines that the mobile station 14 is subscribed to prepaid SMS, the SGSN 18 sends a query to the prepaid database 28 to determine if the user has a sufficient account balance for SMS. If there is a sufficient balance in the user's account, then SMS is enabled. However, if there is an insufficient account balance, then SMS is disabled for the mobile station.

The SGSN 18 is coupled to a system 26 that includes an SMS-GMSC (short message service-gateway mobile switching center) and an SMS-IWMSC (short message service-interworking mobile switching center) over a Gd interface to enable communications of short messages. The SMS-GMSC and SMS-IWMSC (collectively referred to as "SMS-MSC 26") are connected to the SGSN 18 to enable GPRS mobile stations to send and receive short messages over GPRS radio channels.

Figure 2:
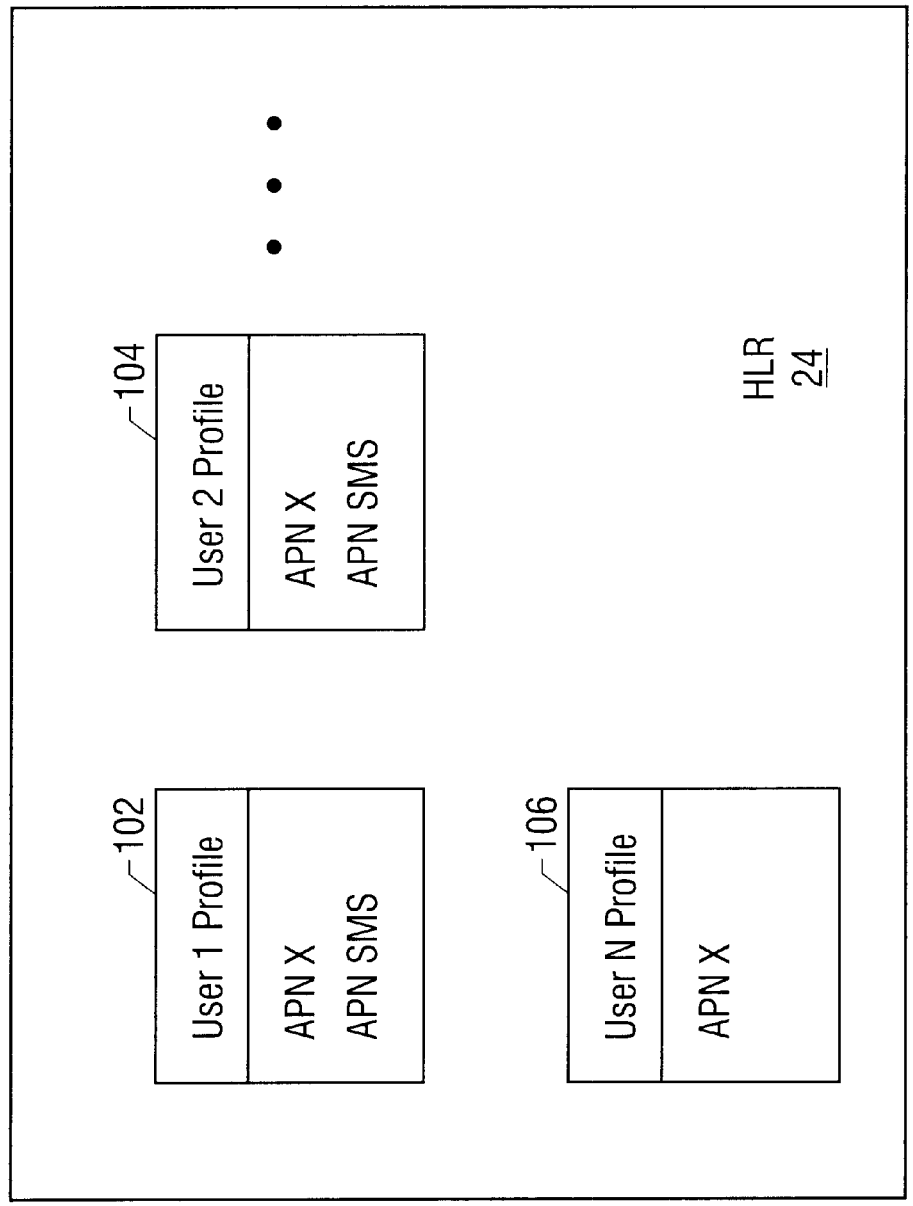
FIG. 2 illustrates subscriber data stored in a home location register (HLR) in the mobile communications system of FIG. 1.

Referring to FIG. 2, the HLR 24 contains user profiles or subscription data 102, 104, and 106 that are associated with different subscribers. The profile 102 (associated with user 1) has two APN fields, an APN X field specifying the access point to the packet network that user 1 is connected to, and an SMS APN field to indicate that user 1 is subscribed to prepaid SMS. Similarly, other supplementary services may be enabled using other APN fields. The user 2 profile 104 contains the same elements as the user 1 profile 102. However, the user N profile 106 does not have the SMS APN field (or it contains the SMS APN field that is at an inactive state), so that prepaid SMS is not available to user N.

Figure 3:
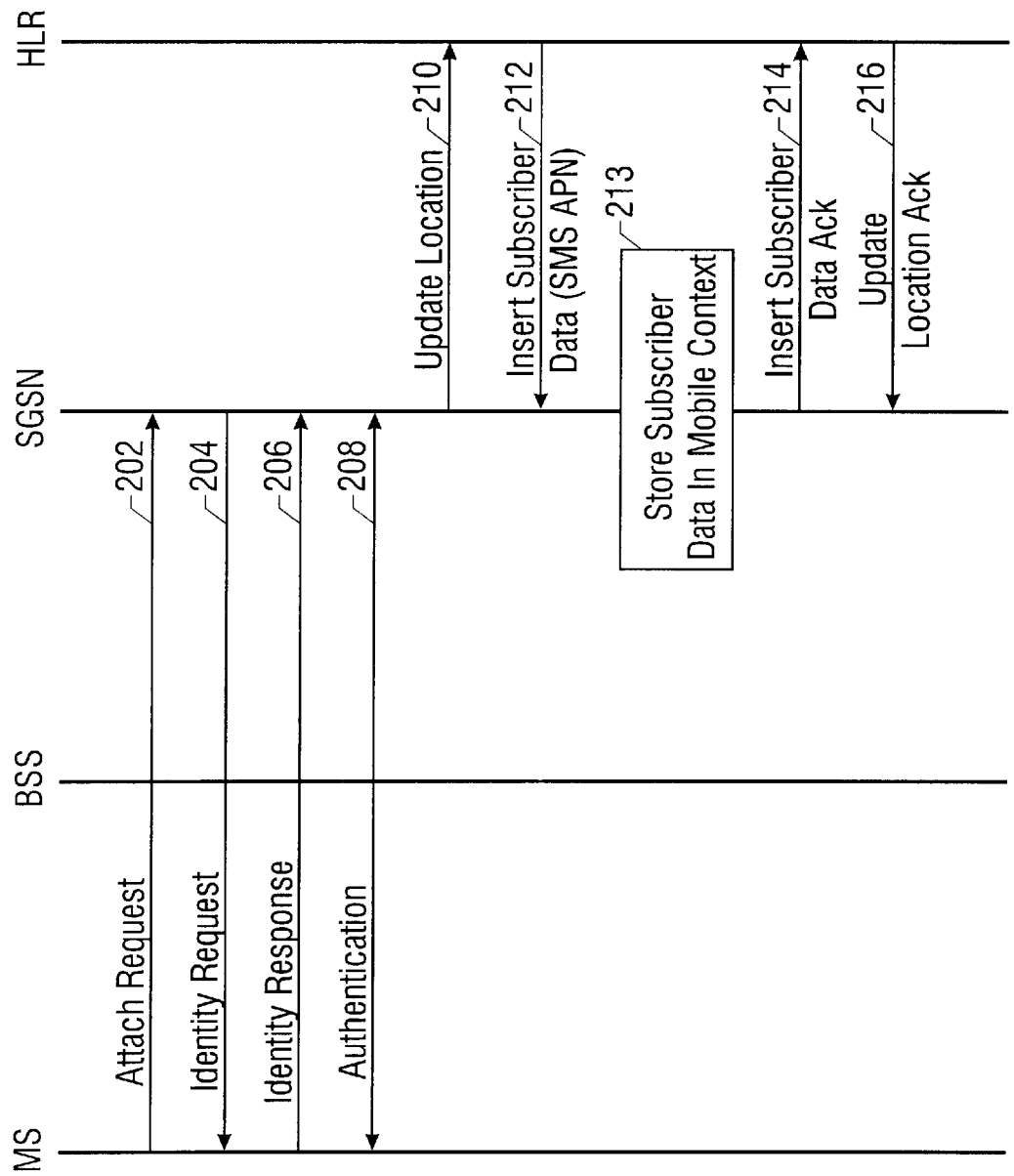
FIG. 3 is a message flow diagram illustrating a mobile station attachment procedure as well as the downloading of subscriber data into a serving General Packet Radio Service (GPRS) node (SGSN) in the mobile communications system of FIG. 1.

Referring to FIG. 3, a process in which a mobile station attaches to the SGSN 18 is illustrated. When a mobile station first starts up or enters a network managed by the SGSN 18, it performs an attach procedure. The mobile station 14 sends an ATTACH request (at 202) to the SGSN 18. If the mobile station is unknown to the SGSN 18, then the SGSN 18 sends an IDENTITY request (at 204) to the mobile station. In response, the mobile station sends back an IDENTITY response (at 206). Further, an authentication task may be performed (at 208) between the mobile station 14 and the SGSN 18.

The SGSN 18 then sends an UPDATE LOCATION message (at 210) to the HLR 24 to request subscriber information for the user of the mobile station 14. In response, the HLR 24 sends an INSERT SUBSCRIBER DATA message to the SGSN 18. The INSERT SUBSCRIBER DATA message contains the GPRS subscription data for the mobile station. The SGSN 18 then checks the subscriber data to determine if the ATTACH request from the mobile station should be rejected. If the check is successful, the SGSN 18 stores (at 213) the subscriber data in a mobility management (MM) context and a PDP context. In one embodiment of GPRS, the PDP context can be considered part of the MM context. Alternatively, the MM and PDP contexts may be kept separately. The MM and/or PDP context is referred to as the "mobile context." Examples of information kept in the mobile context includes the PDP Type field (to indicate an IP or X.25 data network), PDP address, one or more APN fields, and other information. One of the APN fields is the SMS APN field to indicate if the user has subscribed to prepaid SMS.

The SGSN 18 then sends an INSERT SUBSCRIBER DATA ACK message (at 214) to the HLR 24 to acknowledge the receipt of the subscriber date. The HLR 24 acknowledges the UPDATE LOCATION message by sending an UPDATE LOCATION ACK message (at 216) to the SGSN 18.

Figure 4:
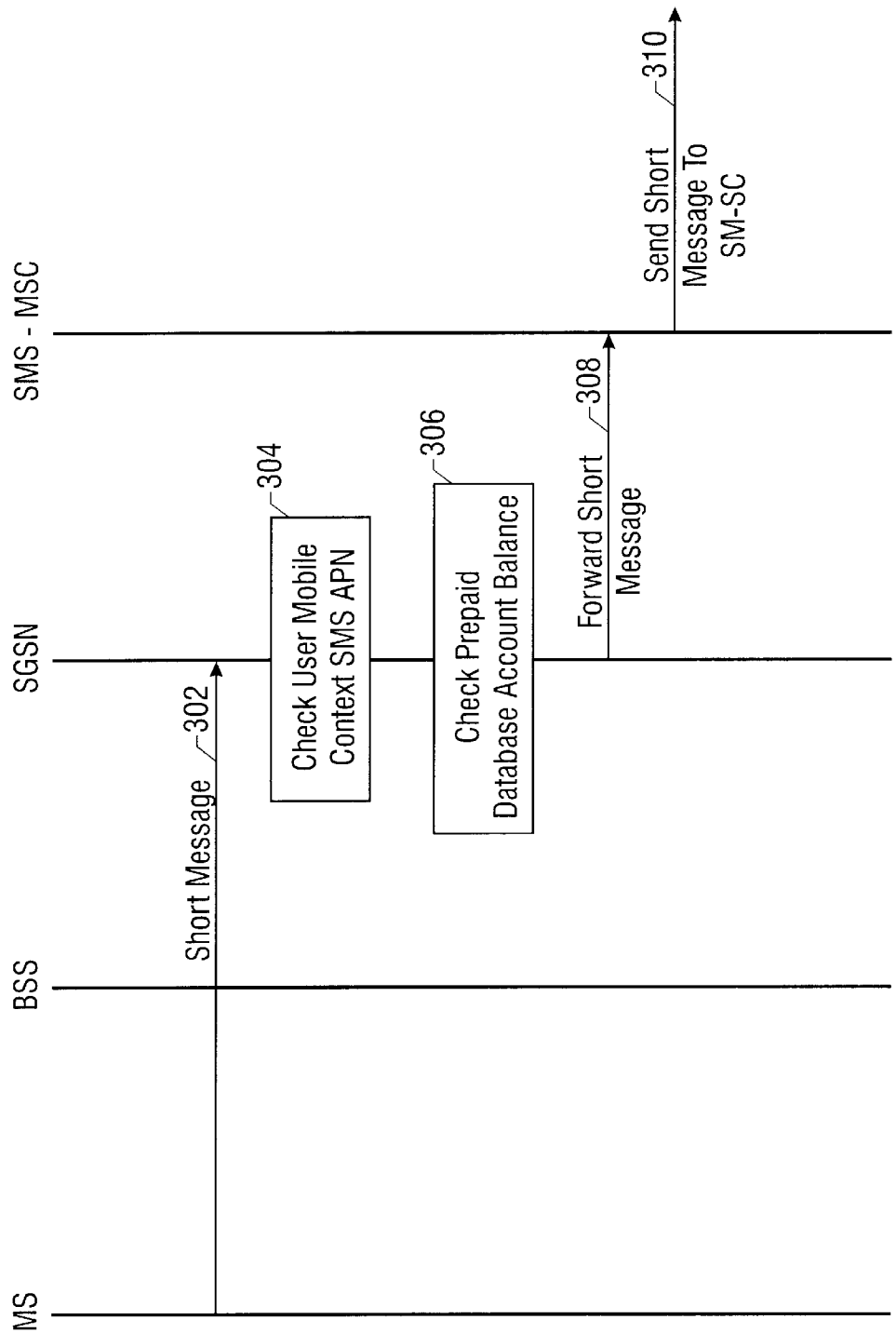
FIG. 4 is a message flow diagram by which a mobile station is able to send a short message according to a prepaid short message service provided by the SGSN.

Referring to FIG. 4, a mobile-originated SMS transfer is illustrated. The mobile station sends (at 302) a short message (according to SMS) to the SGSN 18. The SGSN 18 checks the user's mobile context (at 304) to determine if the mobile station has subscribed to prepaid SMS. The SGSN 18 does this by checking the state of the SMS APN. In one embodiment, the SMS APN is not stored in the mobile context if the user has not subscribed to prepaid SMS. However, in another embodiment, the SMS APN field is included in the mobile context and has one of two states to indicate if the user has subscribed to prepaid SMS (an active state to indicate subscription to prepaid SMS and an inactive state to indicate no subscription to prepaid SMS).

If the mobile station is allowed to originate the short message (based on the presence or state of the SMS APN field), then the SGSN 18 checks the prepaid database 26 account balance for the user (at 306). If the SGSN 18 receives an indication that the short SMS message can be sent (that is, the user has a sufficient account balance in the prepaid database), the SGSN 18 forwards the short message (at 308) to the SMS-MSC 26. The SMS-MSC 26 then passes the short message to a SM-SC (short message service center) to deliver the short message to the destination terminal.

For inbound short messages (those that are sent to the mobile station 14), the SMS APN in the HLR 24 can also be used to determine if prepaid SMS is enabled so that the mobile user can receive short messages. The checking of the value of SMS APN may be performed by the SMS-MSC 26 or by the SGSN 18.

Figure 5A:
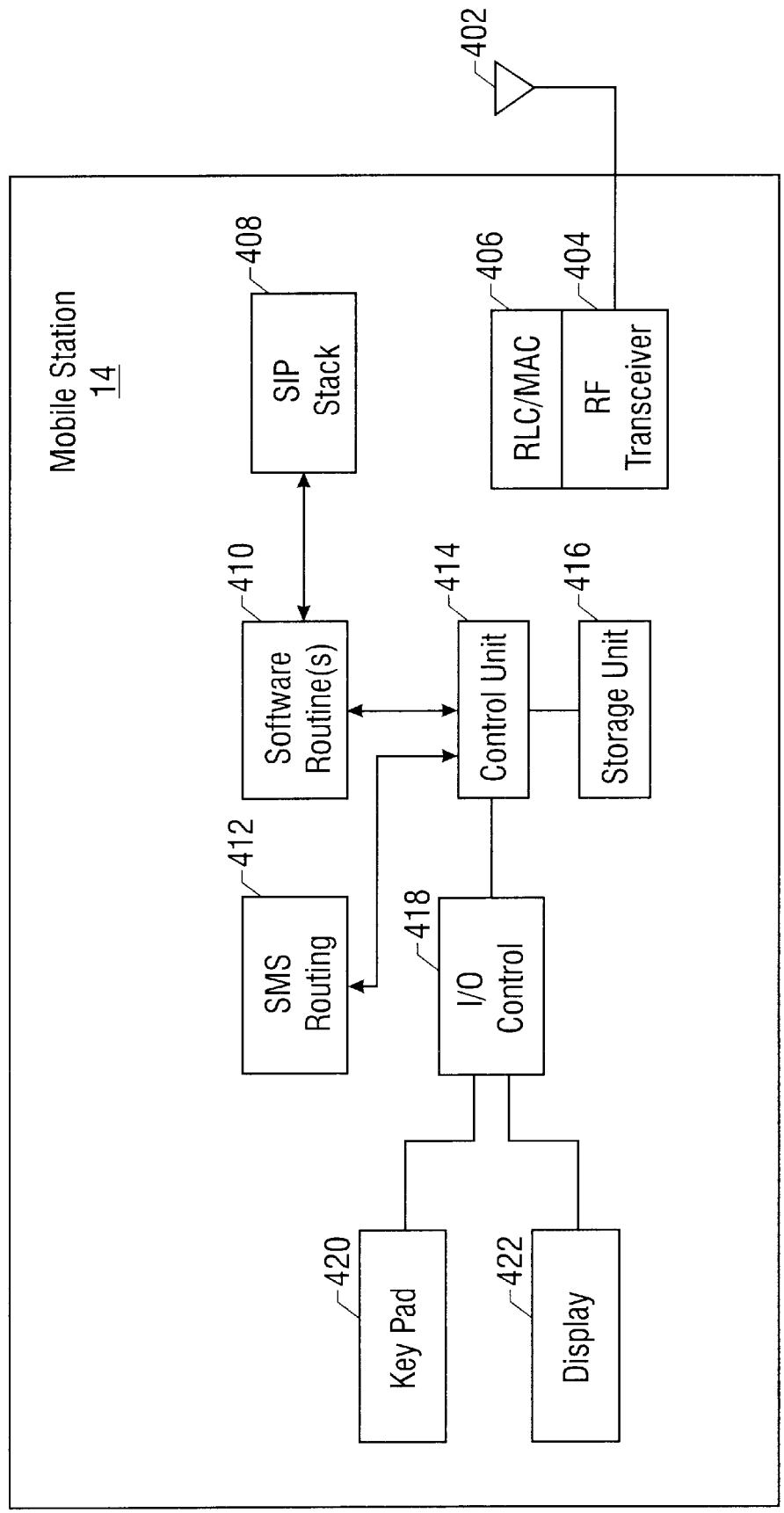
FIGS. 5A–5B are block diagrams of components in the mobile communications system of FIG. 1.
Figure 5B:
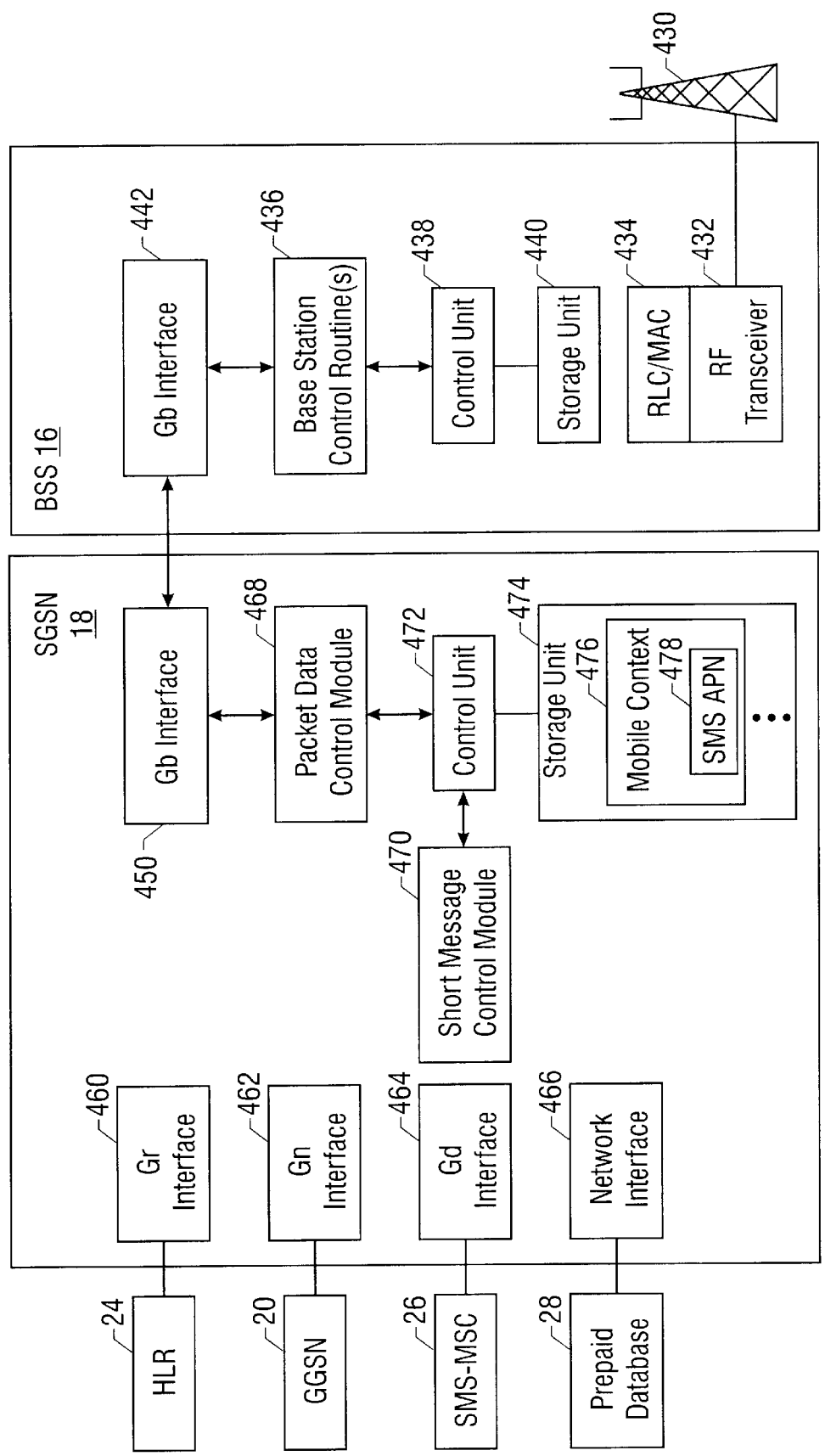

Referring to FIGS. 5A–5B, the components of the mobile station 14, BSS 16, and SGSN 18, in accordance with one example embodiment, are illustrated. RF signals are exchanged between an antenna 402 of the mobile station 14 and an antenna tower 430 coupled to the BSS 16. The mobile station 14 further includes an RF transceiver 404 and a radio link control/medium access control (RLC/MAC) layer 406. The RLC function provides a radio solution dependent reliable link, and the MAC function controls the access signaling (request and grant) procedures for the radio channel. Other layers (not shown) are also in the mobile station 14. The mobile station further includes a control unit 414 that is coupled to a storage unit 416. One or more software routines 410 are executable on the control unit 414. One of the software routines 410 is an SMS routine 412 that controls the short messaging task performed in the mobile station 14.

Another module in the mobile station 14 is a Session Initiation Protocol (SIP) stack 408, which generates messages for establishing call sessions between the mobile station 14 and another node over the packet-based data network 22. SIP is described in RFC 2543, entitled "SIP: Session Initiation Protocol," dated in 1999. In other embodiments, instead of a SIP stack 408, an H.323 module may be employed for establishing call sessions over the packet-based data network 22. The H.323 Recommendation is provided by the International Telecommunication Union (ITU). The SIP stack 408 (or H.323 module) enables voice over IP or other forms of real-time, interactive communications between the mobile station 14 and another node coupled to the packet-based data network 22. Also, other applications may be present in the mobile station 14, include applications for electronic mail, web browsing, and so forth.

The mobile station 14 also includes a keypad 420 and a display 422 coupled through an input/output (I/O) control block 418. Although not shown, a microphone enables audio input and a speaker enables audio output.

In the BSS 16, an RF transceiver 432 is coupled to the antenna tower 430. The BSS 16 also includes an RLC/MAC layer 434 as well as other layers (not shown). One or more base station control routines 436 are executable in the BSS 16 on a control unit 438 that is coupled to a storage unit 440. The BSS 16 includes a Gb interface 442 that includes various layers. In one arrangement, the Gb interface includes a Frame Relay link, while in another arrangement, the Gb interface includes an IP network. The Gb interface 442 in the BSS 16 is coupled to a Gb interface 450 in the SGSN 18.

In addition, the SGSN 18 includes a packet data control module 468 that provides the main access control for packet-based communications by mobile stations 14. Also, a short message service control module 470 is also executable on one or more control units 472. The SGSN 18 further includes a storage unit 474 that stores the mobile context 476 of the mobile station 14. Multiple mobile contexts 476 can be stored in the storage unit 474 for corresponding mobile stations 14 within the coverage area of the mobile communications system controlled by the SGSN 18.

The mobile context 476 contains the SMS APN 478 that is accessed by the SGSN 18 to determine if prepaid SMS has been subscribed to by the user of the mobile station 14. The SGSN 18 also includes a Gr interface 460 to the HLR 24, a Gn interface 462 to the GGSN 20, a Gd interface to the SMS-MSC 26, and a network interface 466 to the prepaid database 28. The network interface 466 may be coupled to various different types of networks, such as LANs, WANs, wireless links, and so forth.

The various system layers, routines, or modules may be executable on control units, such as control units 472, 438, and 414. Each control unit includes a microprocessor, a microcontroller, a processor card (including one or more microprocessors or microcontrollers), or other control or computing devices. As used here, a "controller" refers to hardware, software, or a combination of both.

The storage units referred to in this discussion include one or more machine-readable storage media for storing data and instructions. The storage media may include different forms or memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The instructions of the software routines or modules may be loaded or transported into the node or element in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system for use in a mobile communications system, comprising:
    an interface to receive an access point name field from a home location register to indicate whether a user has subscribed to a prepaid short message service; and
    a controller adapted to provide access to a packet-based network and to enable the prepaid short message service if the access point name field has a first state.

2. A system for use in a mobile communications system, comprising:
    an interface to receive a predetermined field from a home location register to indicate whether a user has subscribed to a prepaid supplementary service; and
    a controller adapted to provide access to a packet-based network and to enable the prepaid supplementary service if the predetermined field has a first state,
    wherein the predetermined field comprises an access point name field for a General Packet Radio Service mobile communications system.

3. The system of claim 2, wherein the prepaid supplementary service comprises a prepaid short message service.

4. The system of claim 2, wherein the controller is adapted to retrieve information from a database to determine if the user has a sufficient account balance for the prepaid supplementary service.

5. The system of claim 2, wherein the controller is part of a serving General Packet Radio Service support node.

6. The system of claim 2, further comprising a storage unit to store the access point name field, the access point name field assigned to indicate activation of the prepaid supplementary service.

7. The system of claim 6, wherein the storage unit further stores a second access point name field to indicate an access point to the packet-based network.

8. The system of claim 2, further comprising an Internet Protocol layer to provide communications to the packet-based network.

9. The system of claim 2, further comprising a storage unit to store a mobile context for a mobile unit associated with the user, the mobile context containing the predetermined field.

10. The system of claim 9, wherein the mobile context comprises a mobility management context.

11. The system of claim 9, wherein the mobile context comprises a packet data protocol context.

12. The system of claim 9, wherein the mobile context contains at least a portion of subscription data containing the access point name field, the interface to receive the subscription data from the home location register.

13. The system of claim 4, wherein the access point name field comprises a domain name system (DNS) access point name field.

14. A method for use in a mobile communications system that provides access to a packet-based network, comprising:
    receiving a predetermined field from a home location register to indicate if a mobile station is enabled for a prepaid supplementary service; and
    performing, in a system that provides access to the packet-based network, the prepaid supplementary service if the predetermined field has a first state,
    wherein receiving the predetermined field comprises receiving an access point name field.

15. The method of claim 14, wherein the prepaid supplementary service is performed by a serving General Packet Radio Service system.

16. The method of claim 14, wherein receiving the access point name field comprises receiving the access point name field contained in subscription data stored in the home location register.

17. The method of claim 14, wherein performing the prepaid supplementary service comprises performing a prepaid short message service.

18. The method of claim 17, wherein performing the prepaid short message service comprises sending a short message to a short message service controller system.

19. The method of claim 14, further comprising:
    receiving a request from a mobile station to perform the prepaid supplementary service; and
    detecting for a state of the predetermined field that is retrieved from a home location register, wherein performing the prepaid supplementary service is based on the detecting.

20. The method of claim 14, wherein receiving the access point name field comprises receiving a domain name system (DNS) access point name field.

21. A method for use in a mobile communications system that provides access to a packet-based network, comprising:
    receiving a short message request from a mobile station;
    receiving an access point name field from a home location register to indicate if the mobile station is enabled for a prepaid short message service; and
    performing, in a system that provides access to the packet-based network, the prepaid short message service if the access point name field has a first state; and
    accessing a database to determine if the mobile station has a sufficient account balance for the prepaid short message service.

22. An article comprising at least one storage medium containing instructions for controlling communications in a mobile communications system, the instructions when executed causing a controller to:
    receive a request from a mobile unit to establish a link, the link enabling communications with a packet-based network;
    send a request to a home location register for subscription data associated with the mobile unit, the subscription data containing an access point name field to indicate that the mobile unit is enabled for a prepaid supplementary service; and store the access point name field to indicate that the mobile unit is enabled for the prepaid supplementary service.

23. The article of claim 22, wherein the instructions when executed cause the controller to further store a second access point name field to indicate an access point to the packet-based network.

24. The article of claim 22, wherein the instructions when executed cause the controller to further receive a request from the mobile unit to perform the supplementary service.

25. The article of claim 24, wherein the instructions when executed cause the controller to further detect for presence of the access point name field and to perform the prepaid supplementary service if the access point name field is present.

26. The article of claim 24, wherein the instructions when executed cause the controller to further determine if the access point name field has a first state and to perform the prepaid supplementary service if the access point name field has the first state.

27. The article of claim 22, wherein the prepaid supplementary service comprises a prepaid short message service.

28. The article of claim 22, wherein the access point name field comprises a domain name system (DNS) access point name field.

29. A data signal embodied in a carrier wave and comprising instructions for controlling communications in a mobile communications system, the instructions when executed causing a controller to:

receive a predetermined an access point name field from a home location register to indicate if a mobile unit is enabled for a prepaid short message service;

provide access to a packet-based network for the mobile unit;

receive a request to perform the prepaid short message service access a database to determine whether the mobile unit has a sufficient account balance for the prepaid short message service; and enable performance of the prepaid short message service based on the access point name field and whether the mobile unit has a sufficient account balance.

* * * * *

UNITED STATES PATENT AND TRADEMARK OFFICE
CERTIFICATE OF CORRECTION

PATENT NO. : 6,801,781 B1
DATED : October 5, 2004
INVENTOR(S) : Curtis M. Provost, Jerry L. Mizzel and Donald B. Keeler It is certified that error appears in the above-identified patent and that said Letters Patent is hereby corrected as shown below:

Column 10,
Line 9, delete "a predetermined".

Signed and Sealed this

Thirtieth Day of November, 2004

JON W. DUDAS
*Director of the United States Patent and Trademark Office*